US006897630B2

(12) United States Patent
Murray et al.

(10) Patent No.: US 6,897,630 B2
(45) Date of Patent: May 24, 2005

(54) SYSTEM AND RELATED METHODS FOR SENSING FORCES ON A MOVABLE BARRIER

(75) Inventors: James S. Murray, Milton, FL (US); Thomas B. Bennett, III, Wooster, OH (US)

(73) Assignee: Wayne-Dalton Corp., Mt. Hope, OH (US)

( * ) Notice: Subject to any disclaimer, the term of this patent is extended or adjusted under 35 U.S.C. 154(b) by 1 day.

(21) Appl. No.: 10/222,743

(22) Filed: Aug. 16, 2002

(65) Prior Publication Data

US 2004/0032232 A1 Feb. 19, 2004

(51) Int. Cl.[7] .................................................. H02P 7/00

(52) U.S. Cl. ....................... 318/434; 318/264; 318/265; 318/468; 49/28; 49/31

(58) Field of Search ................................ 318/434, 264, 318/265, 468, 466; 49/28, 31

(56) References Cited

U.S. PATENT DOCUMENTS 3,909,980 A * 10/1975 Courtney et al. ............. 49/199
4,311,225 A * 1/1982 Tsubaki et al. ......... 192/142 R
4,408,146 A 10/1983 Beckerman ................. 318/264
4,726,145 A * 2/1988 Rokicki ....................... 49/220
5,218,282 A 6/1993 Duhame ..................... 318/603
5,278,480 A 1/1994 Murray ....................... 318/626
5,798,681 A 8/1998 Chang ................... 340/815.45
5,929,580 A * 7/1999 Mullet et al. ............... 318/466
5,998,950 A 12/1999 Fitzgibbon et al. ......... 318/280
6,005,361 A 12/1999 Grinewitschus et al. .... 318/469
6,111,374 A 8/2000 Fitzgibbon et al. ......... 318/282
6,118,243 A 9/2000 Reed et al. ................. 318/468
6,161,438 A * 12/2000 Mullet et al. ................. 73/774
6,209,262 B1 4/2001 Mathis .......................... 49/28
6,246,196 B1 6/2001 Fitzgibbon et al. ......... 318/430
6,326,751 B1 * 12/2001 Mullet et al. ............... 318/434
6,605,910 B2 * 8/2003 Mullet et al. ............... 318/264
6,806,665 B2 * 10/2004 Fitzgibbon et al. ......... 318/282
2003/0192254 A1 * 10/2003 Brookbank et al. ........... 49/199

* cited by examiner

*Primary Examiner*—Rita Leykin
(74) *Attorney, Agent, or Firm*—Renner, Kenner, Greive, Bobak, Taylor & Weber

(57) ABSTRACT

An operator system and related methods (10) for sensing forces on a movable barrier (12) includes a motor (52), a trolley (30), and a trolley arm (34) having a first end slidably supported by the trolley (38) and a second end coupled to the movable barrier. The motor moves the trolley arm which in turn moves the movable barrier. A force detection mechanism (68) is coupled to the motor to determine a first component force value applied by the motor. A controller (54) receives the first component force value and determines a detected force value by scaling the first component force value with a second component force value derived from an angular position of the trolley arm's first end with respect to the trolley. The angular position of the trolley arm may be fixed or variable. An angle potentiometer (72) is coupled to the trolley arm to generate an angle signal for use as the second component force value when the trolley arm's angular position is allowed to vary.

21 Claims, 4 Drawing Sheets

SYSTEM AND RELATED METHODS FOR SENSING FORCES ON A MOVABLE BARRIER

TECHNICAL FIELD

Generally, the present invention relates to detecting and measuring the force applied to a door or any device that is directly connected to a trolley-type operator as the door travels between open and closed positions. In particular, the present invention relates to a system which utilizes the angle of a trolley arm to monitor the force applied to an overhead door during each cycle. Specifically, the present invention relates to a system that monitors the force applied and, along with other monitored data, determines if an obstruction has been encountered.

BACKGROUND ART

As is well known, motorized door operators automatically open and close a garage door or the like through a path that is defined by a physical upper limit and a physical lower limit. The physical lower limit is established by the floor upon which the garage door closes. The physical upper limit can be defined by the highest point the door will travel, which can be limited by the operator, the counterbalance system, or the door track system's physical limits. The operator's upper and lower limits are employed to prevent door damage resulting from the operator's attempt to move a door past its physical limits. Under normal operating conditions, the operator's limits may be set to match the door's upper and lower physical limits. However, operator limits are normally set to a point less than the door's physical upper and lower limits.

One known limit system employs pulse counters that set the upper and lower travel of the door by counting the revolutions of an operator's rotating component. These pulse counters are normally coupled to the shaft of the motor and provide a count to a microprocessor. The upper and lower limits are programmed into the microprocessor by the consumer or installer. As the door cycles, the pulse counter updates the count to the microprocessor. Once the proper count is reached, which corresponds to the count of the upper and lower limits programmed by the consumer or installer, the door stops. Unfortunately, pulse counters cannot accurately keep count. External factors such as power transients, electrical motor noise, and radio interference often disrupt the count, allowing the door to over-travel or under-travel. The microprocessor may also lose count if power to the operator is lost or if the consumer manually moves the door while the power is off and the door is placed in a new position that does not match the original count.

Motorized garage door operators often include primary entrapment safety systems designed to monitor door speed and applied force as the door travels in the opening and closing directions. During travel from the open-to-close and from the close-to-open positions, the door maintains a relatively constant speed. However, if the door encounters an obstacle during travel, the speed of the door slows down or stops, depending upon the amount of negative force applied by the obstacle. Systems for detecting such a change in door speed and applied force are commonly referred to as "internal entrapment protection" systems. Once the internal entrapment protection is activated, the door may stop or stop and reverse direction.

Most residential operator systems are closed loop systems, wherein the door is always driven by the operator in both the open-to-close and close-to-open directions. A closed loop system works well with the internal entrapment safety system, wherein the operator is always connected to the door and exerting a force on the door when the door is in motion unless it is disconnected manually by the consumer. If an obstacle is encountered by the door, the direct connection to the operator allows for feedback to the internal entrapment device, which signals the door to stop or stop and reverse. However, due to the inertia and speed of the door and the tolerances in the door and track system, these internal entrapment systems are very slow to respond, and some time passes after contacting an obstruction before the internal entrapment device is activated, thus allowing the door to over-travel and exert very high forces on an object that is entrapped. As such, known internal entrapment systems, by themselves do not work well, especially when the open/close cycle is remotely actuated. Some systems even incorporate timers that will cause the door to open if the bottom limit is not contacted within 30 seconds from the time the door started to close. In most instances, this length of time is much too long. Further, a closed loop operator system always has the capability of exerting a force on the obstruction greater than the weight of the door.

A known method of internal entrapment safety protection on a closed loop system uses a pair of springs to balance a lever in a center position and a pair of switches to indicate that the lever is off-center, thereby signaling that an obstruction has been encountered. The lever is coupled to a drive belt or chain and balanced by a pair of springs adjusted to counterbalance the tension on the belt or chain so the lever stays centered. When an obstruction is encountered, the tension on the belt or chain overcomes the tension applied by the springs, thus allowing the lever to shift off-center and contact a switch that generates an obstruction signal. Sensitivity of this system can be adjusted by applying more tension to the centering springs to force the lever to stay centered. This type of internal entrapment systems is slow to respond due to the inertia of the door, the stretch in the drive belt or chain, and the components of the drive system.

Another prior art closed loop operator with an internal entrapment safety system uses an adjustable clutch mechanism. The clutch is mounted on a drive component and allows slippage of the drive force to occur if an obstruction prevents the door from moving. The amount of slippage can be adjusted in the clutch so that a small amount of resistance to the movement of the door causes the clutch to slip. However, due to aging of the door system and environmental conditions that can change the force required to move the door, these systems are normally adjusted to the highest force condition anticipated by the installer or the consumer. Further, over time the clutch plates can corrode and freeze together, preventing slippage if an obstruction is encountered.

In addition to using the aforementioned pulse counters to set the upper and lower limits of door travel, they may also be used to monitor the speed of the garage door for use with an internal entrapment safety system. The optical encoders used for speed monitoring are normally coupled to the shaft of the motor. An interrupter wheel disrupts a path of light from a sender to a receiver. As the interrupter or chopper wheel rotates, the light path is reestablished. These light pulses are then sent to a microprocessor every time the beam is interrupted. Alternatively, magnetic flux sensors function the same except that the chopper wheel is made of a ferromagnetic material and the wheel is shaped much like a gear. When the gear teeth come in close proximity to the sensor, magnetic flux flows from the sender through a gear tooth and back to the receiver. As the wheel rotates, the air gap between the sensor and the wheel increases. Once this gap becomes fully opened, the magnetic flux does not flow to the receiver. As such, a pulse is generated every time magnetic flux is detected by the receiver. Since motor control circuits used for operators do not have automatic speed compensation, the speed is directly proportional to the load. Therefore, the heavier the load, the slower the rotation of the motor. The optical or magnetic encoder counts the number of pulses in a predetermined amount of time. If the motor slows down, the count is less than if the motor had moved at its normal speed. Accordingly, the internal entrapment safety device actuates as soon as the number of pulses counted falls below a manually set threshold during the predetermined period of time.

From the foregoing discussion it will be appreciated that as a residential garage door travels in the opening and closing directions, the force needed to move the door varies depending upon the door position or how much of the door is in the vertical position. Counterbalance springs are designed to keep the door balanced at all times if the panels or sections of the door are uniform in size and weight. The speed of the door panels as they traverse the transition from horizontal to vertical and from vertical to horizontal can cause variations in the force generated by the operator to move the door. Further, the panels or sections can vary in size and weight by using different height panels together or adding windows or reinforcing members to the panels or sections.

To compensate for these variations, a force setting must be employed to overcome the highest force experienced to move the door throughout the distance the door travels. For example, the force to move a door could be as low as 5 to 10 pounds at the initiation of the movement and increase to 35 to 40 pounds at another part of the movement. Therefore, the force setting on the operator must be at least 41 pounds to assure the internal entrapment device will not prematurely activate. If an obstacle is encountered during the time the door is in the 35 to 40 pound range, it will take only 1 to 6 pounds of force against the object to activate the internal entrapment device. However, if the door is in the 5 to 10 pound range, the door will require up to 31 to 36 pounds of force against the object before the internal entrapment device activates. To exacerbate this condition, the force adjustments on these internal entrapment devices are set by the consumer or the installer to allow the operator to exert several hundred pounds of force before the internal entrapment device will activate. As such, it is common to find garage door operators that can crush automobile hoods and buckle garage door panels before the internal entrapment system is triggered.

Two patents have attempted to address the shortcomings of properly triggering internal entrapment systems. One such patent, U.S. Pat. No. 5,278,480, teaches a microprocessor system that learns the open and closed position limits as well as force sensitivity limits for up and down operation of the door. This patent also discloses that the closed position limit and the sensitivity limits are adaptably adjusted to accommodate changes in conditions to the garage door. Further, this system may "map" motor speed and store this map after each successful closing operation. This map is then compared to the next closing operation so that any variations in the closing speed indicate that an obstruction is present. Although this patent is an improvement over the aforementioned entrapment systems, several drawbacks are apparent. First, the positional location of the door is provided by counting the rotations of the motor with an optical encoder. As discussed previously, optical encoders and magnetic flux pickup sensors are susceptible to interference and the like. This system also requires that a sensitivity setting must be adjusted according to the load applied. As noted previously, out-of-balance conditions may not be fully considered in systems with an encoder. Although each open/close cycle is updated with a sensitivity value, the sensitivity adjustment is set to the lowest motor speed recorded in the previous cycle. Nor does the disclosed system consider an out-of-balance condition or contemplate that different speeds may be encountered at different positional locations of the door during its travel.

Another patent, U.S. Pat. No. 5,218,282, also provides an obstruction detector for stopping the motor when the detected motor speed indicates a motor torque greater than the selected closing torque limit while closing the door. The disclosure also provides for at least stopping the motor when the detected motor speed indicates that motor torque is greater than the selected opening torque limit while opening the door. This disclosure relies on optical counters to detect door position and motor speed during operation of the door. As discussed previously, the positional location of the door cannot be reliably and accurately determined by pulse counter methods.

U.S. Pat. No. 5,929,580, which is owned by the Assignee of the present application and which is incorporated herein by reference, provides for an internal entrapment system. The disclosure provides a potentiometer coupled to the door to determine its position and a pulse counter that determines an amount of force or motor torque used to open and close the door. Although effective, this system optimally requires temperature sensors to accommodate any impact that temperature changes may have on the motor and pulse-counting sequence.

Another type of system connected to a door is a trolley-type garage door operator that applies an operating force to the garage door. As with the other types of garage door opening systems, the trolley-type operator employs a direct connection of the motorized unit to the door. Unfortunately, the typical trolley-type operator is not sensitive enough to provide adequate entrapment protection in that the operator is slow to respond when an obstruction is encountered, and secondary entrapment protection is provided to achieve improved protection.

Based on the foregoing discussion of internal entrapment systems, it will be appreciated that there is a great need for a backup or secondary entrapment system. The secondary or external entrapment system is required in the event the internal or primary entrapment system fails or is slow to respond. Common secondary entrapment systems employ photo cells or edge sensors. These devices may have dead spots in areas that need detection beyond the range of individual sensors. This can be corrected by adding additional sensors to cover the dead spot, but this adds to the cost of the protection system and to the cost of installation. Additionally, these types of sensors require alignment to work properly and can become misaligned during use. These sensors are also affected by moisture and dust on their lenses, preventing proper operation. Some of these devices are pressure-sensitive switches that are mounted on the door or the edges of the opening and will generate a signal if compressed, indicating an obstruction is present between the door and the opening. These switches must extend through or along the perimeter of the opening and will increase in cost proportional to the size of the opening. Further, the materials used to manufacture these devices can vary in hardness with the environmental temperatures changing, creating less sensitive detection in cold weather and sometimes too sensitive in hot weather.

Doors that are directly connected to the motorized unit, such as a garage door and a garage door operator, are not precise units due to the slack in the mechanical drive train and the methods of attaching to the door. Moreover, the guide rails and the mountings can deflect when an obstruction is encountered, delaying or preventing standard sensors from indicating an obstruction.

Photo cells require wiring sized to the opening to transmit the signal back to the motor controls or a wireless device that requires a battery. The edge sensors that are attached to the door also require wiring that must be commutated from the movable closure to the motor control. Alternatively, a wireless transmitter may be used. Edge sensors that are attached to the opening must also have provisions to send signals to the motor controls. As will be appreciated, this extensive wiring adds to the cost of installation and is susceptible to damage.

One attempt at incorporating an internal entrapment system with a trolley-type operator is disclosed in U.S. Pat. No. 6,161,438, which is incorporated herein by reference. The '438 patent teaches the use of a strain gauge attached to the trolley arm to monitor the force that the arm is applying to the door. These detected forces are associated with a position of the door—as detected by a potentiometer or the like- to establish a force profile for the opening and closing cycles. However, the strain gauge does not necessarily detect the force that the operator is applying to the arm. This may lead to an inaccurate reading of force actually applied to the door and results in false readings. And the strain gauge is a costly component. Due to the inaccuracy of correlating a force that the arm is applying to the door, instead of the force applied by the operator, safety standards still require that a secondary entrapment system be used with trolley-type operator systems.

DISCLOSURE OF INVENTION

Therefore, an object of the present invention is to provide an entrapment system to monitor door position and applied force as the door travels in the opening and closing directions, wherein if the door encounters an obstacle during opening and closing, the applied force at a particular door position will change. A further object of the present invention is to provide entrapment protection by knowing the amount of force required to move an object, such as a door, through a specific amount of distance or time. Another object of the present invention is to stop and reverse or just stop travel of the door if predetermined thresholds of applied force and corresponding positions are not met. Still another object of the present invention is to generate door profile data during an initial door open and close cycle and whereupon the door profile data and predetermined thresholds are updated after each cycle.

Another object of the present invention is to provide an entrapment system with a position potentiometer that is coupled to the door to determine the exact position of the door. A further object of the present invention is to provide a position potentiometer that is coupled to the door to output a voltage value relative to the position of the door.

Another object of the present invention is to provide an entrapment system with a controller that monitors input from the potentiometer coupled to the door to determine its position and a force detection mechanism to determine force applied to the door as it travels. A further object of the present invention is to provide a controller that generates door profile information based upon various inputs and stores this data in nonvolatile memory. Yet another object of the present invention is to provide a setup procedure to allow for an initial generation of door profile data, wherein the processor reads the door position and the force applied to the door at a plurality of door positions in both opening and closing directions. Still yet another object of the present invention is to detect an angular position of a trolley arm that applies a driving force generated by a motor to the door, wherein the angular position of the trolley arm is either fixed or variable. A further object of the present invention is to provide an angle potentiometer to detect the variable angular position of the trolley arm so that the force applied by the motor to the trolley arm is scaled accordingly for use in the door profile data.

Another object of the present invention is to provide an entrapment system in which a controller reads door profile information during each cycle of the door position and compares the new information with the previously stored information and wherein if the new force profile varies from the stored force profile by a predetermined amount, travel of the door is stopped and/or reversed.

Still another object of the present invention is an operator system for sensing forces on a movable barrier, comprising: a motor; a trolley; a trolley arm having a first end slidably supported by the trolley, and a second end coupled to the movable barrier, wherein the motor moves the trolley arm which moves the movable barrier; a force detection mechanism coupled to the motor to determine a first component force value applied by the motor to the trolley arm; and a controller for receiving the first component force value, wherein the controller determines a detected force value by scaling the first component force value with a second component force value derived from an angular position of the trolley arm's first end with respect to the trolley.

Yet another object of the present invention is to provide a method for sensing forces applied to a movable barrier, wherein a motor slidably moves a trolley arm, which is connected to the movable barrier, along a trolley between open and closed positions, the method comprising: detecting a first component force value generated by the motor; detecting a second component force value derived from an angular position of the trolley arm's angular position with respect to the trolley; and determining a detected force value by scaling the first component force value with the second component force value.

Still yet another object of the present invention is to provide a method for modifying an installed operator system to enable sensing of forces applied to a movable barrier, wherein a motor moves a trolley arm which is connected to the movable barrier along a rail between open and closed positions, and wherein the motor applies a force detected by a controller, the method comprising establishing an angular position of the trolley arm with respect to the rail, and re-programming the controller to receive a value of the angular position for the purpose of determining a detected force value applied by the motor to the movable barrier.

BRIEF DESCRIPTION OF THE DRAWINGS

For a complete understanding of the objects, techniques and structure of the invention, reference should be made to the following detailed description and accompanying drawings, wherein.

BEST MODE FOR CARRYING OUT THE INVENTION

Figure 1:
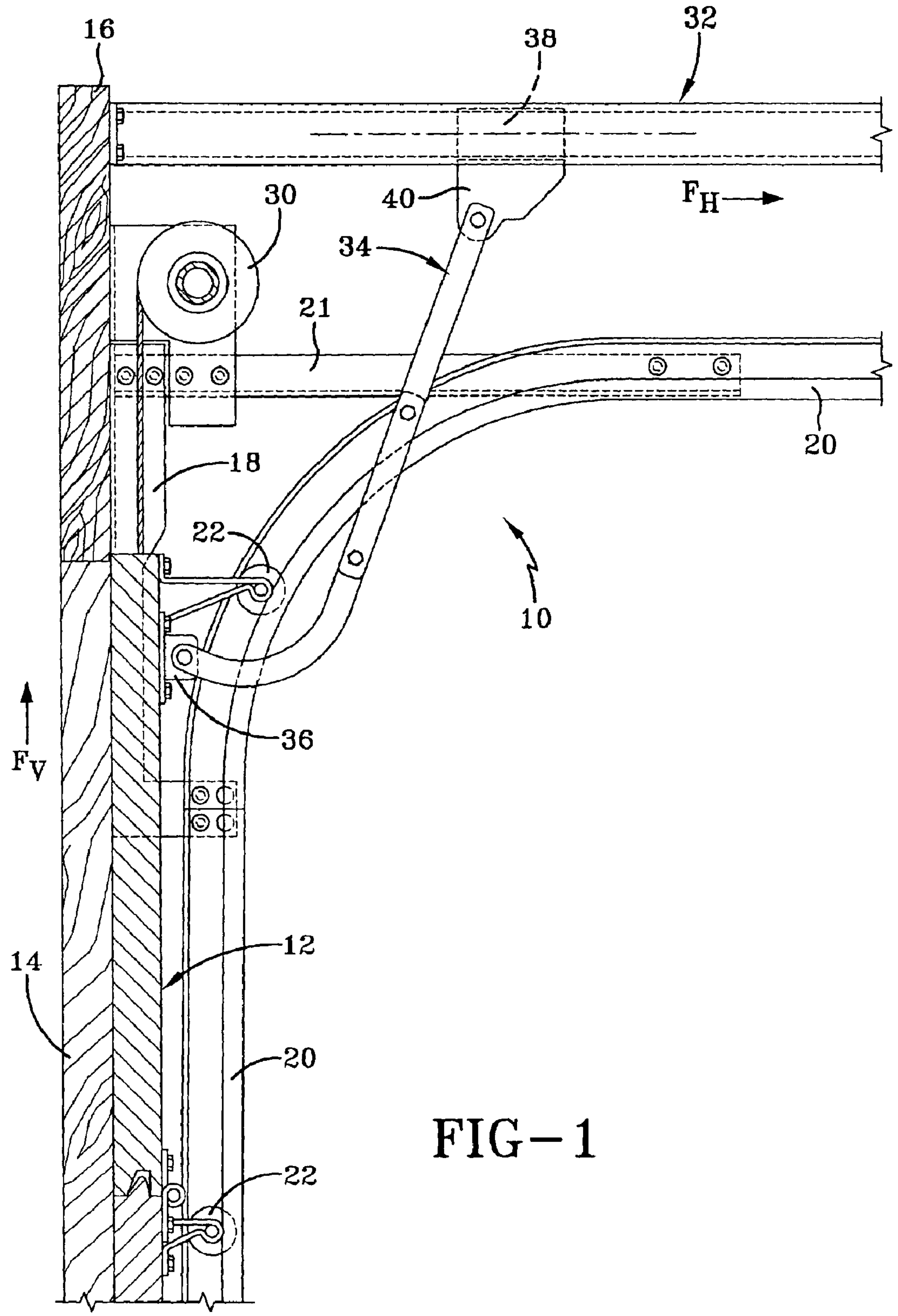
FIG. 1 is a fragmentary schematic side view of a trolley-type operating system associated with a sectional garage door having an internal entrapment system embodying the concepts of the present invention.
Figure 2:
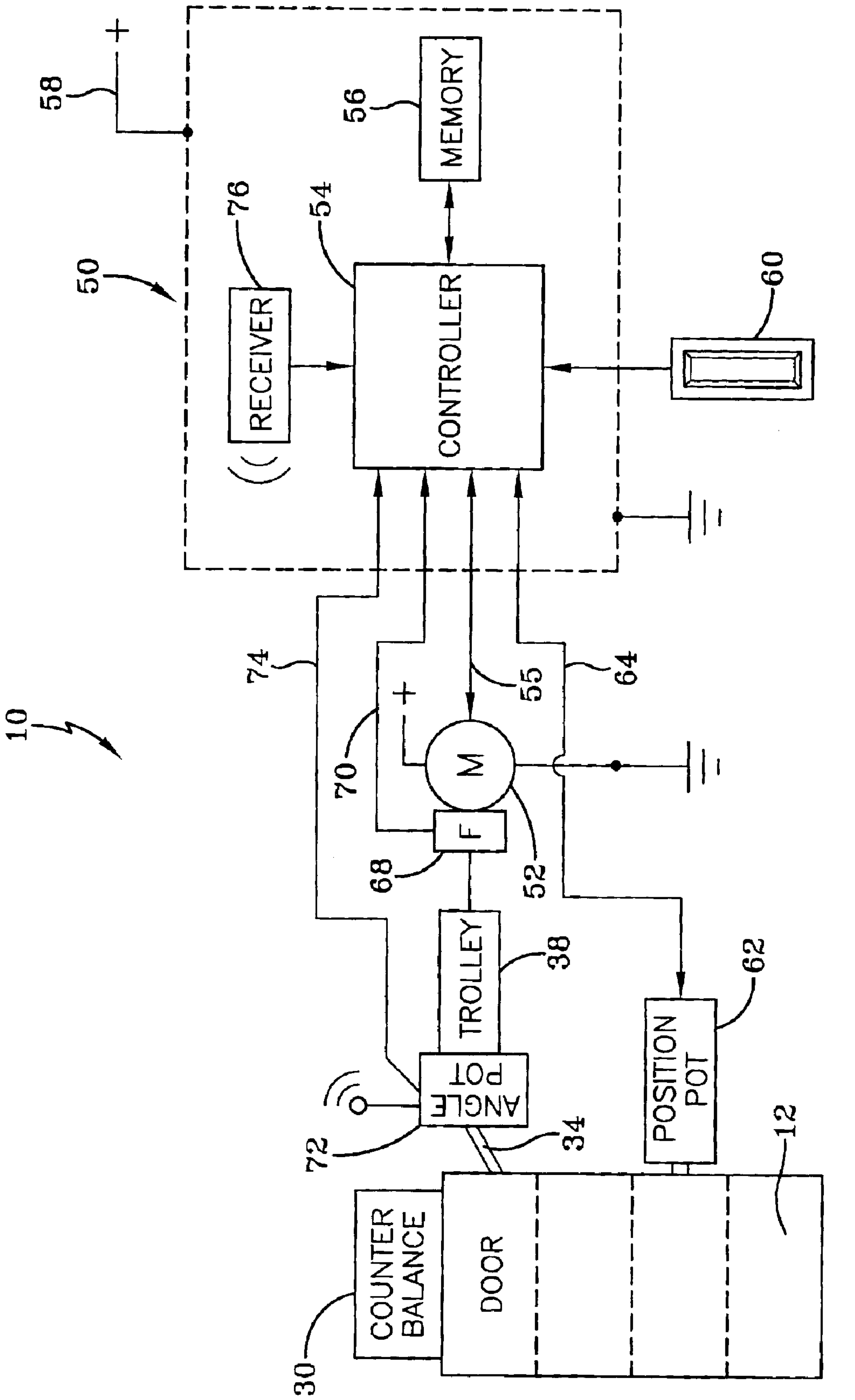
FIG. 2 is a schematic view of the control circuit of the operator mechanism employed in the internal entrapment system.

A system and related methods for sensing forces on a movable barrier is generally indicated by the numeral 10 in FIGS. 1 and 2. As best seen in FIG. 1, the system 10 is employed in conjunction with a conventional sectional garage door, generally indicated by the numeral 12. The present invention may also be employed for use with gates, windows, retractable awnings or other closures directly connected to a driving source such as a motorized operator. The opening in which the door 12 is positioned for opening and closing movements relative thereto is surrounded by a pair of vertically spaced jamb members 14, which are generally parallel and extend vertically upwardly from the ground (only one jamb member is shown). Jambs 14 are spaced apart and joined at their vertical upper extremity by a header 16 to thereby form a generally u-shaped frame around the opening of the door 12. The jamb members 14 and headers 16 are normally constructed of lumber or other structural building materials for the purpose of reinforcement and to facilitate the attachment of elements supporting and controlling the door 12.

Secured to the jambs 14 are L-shaped vertical members 18. A track 20 is secured to each respective vertical member 18 along the vertical length of the track 20. A brace 21 is cantilevered from the top end of the vertical member 18 to support the portion of the track 20 that extends horizontally. The horizontal portion of the track 20 may also be carried or suspended by braces extending from the ceiling. Each track 20 is aligned with the side of the door 12 and extends substantially vertically with the length of the jamb member 14 and then extends substantially horizontally from the upper end of the door 12 in the closed position depicted in FIG. 1. Each track 20 receives a roller 22 that extends from the top edge of the garage door 12. Additional rollers 22 may also be provided at each top vertical edge of each section of the garage door 12 to facilitate transfer between the open and the closed positions.

A counterbalancing system generally indicated by the numeral 30 may be employed to assist movement of the garage door 12 back and forth between opening and closing positions. One example of a counterbalancing system is disclosed in U.S. Pat. No. 5,419,010, which is incorporated herein by reference. Generally, the counterbalancing system 30 is affixed to the header 16 near its ends and at about a midpoint thereof.

A rail 32 is attached to or suspended from the ceiling and is positioned at about a midpoint between the tracks 20. A trolley 38, which may be a wheeled device or have bearings, is slidably carried by the rail 32. A trolley bracket 40 extends substantially downwardly from the trolley 38. A trolley arm 34 interconnects the garage door 12 to the trolley 38. In particular, a door plate 36 extends from a top section of the door 12. One end of the trolley arm 34 is pivotably mounted to the door plate 36. The end of the trolley arm 34 opposite the door plate 36 is mounted to the trolley bracket 40. The trolley 38 is mechanically driven by a chain, screw drive, or the like to push/pull the garage door between a closed position and an open position. This travel or movement is assisted by the counterbalancing system 30.

The trolley arm 34 may be connected to the trolley bracket 40 in one of two ways. In the first embodiment, the trolley arm is attached to the trolley bracket such that the angle of the trolley arm with respect to the rail 32 is fixed. When the trolley arm is fixed, it is preferably fixed at an angle of 45°, although any fixed angle between 20° and 70° could be employed. Alternatively, the trolley arm 34 may be pivotably mounted to the trolley bracket 40 so that the trolley arm is pivotable during linear movement of the bracket. When the trolley arm is pivotable with respect to the trolley bracket 40, and thus with respect to the rail 32, the angle of the trolley arm with respect to the rail can vary anywhere between about 20° to about 70°.

Referring now to FIG. 2 it can be seen that the system 10 includes an operator 50 which controls operation of a motor 52. The operator 50 includes a controller 54 which includes the necessary hardware, software and memory functions to coordinate the operation of the operator 50 and, of course, the opening and closing of the door 12. The controller 54 communicates with the motor 52 via a motor signal 55 for the purpose of ascertaining operating conditions of the motor and to send stop, start or stop/reverse instructions to the motor. A memory device 56 is connected to the controller 54 and stores operating information such as transmission codes, operational parameters, force profiles—which will be discussed in detail later—and other information which is needed for efficient operation of the operator 50 and the overall system 10. A power supply 58 is connected to the operator 50 and to the motor 52 to provide the necessary electrical power to ensure operation of the system 10. The power supply 58 may be a battery, a standard electrical service, or a combination of both. A push button switch 60 is connected to the controller 54 to initiate operation of the motor so as to move the door between opened and closed positions. It will also be appreciated that the controller 54 may receive infrared or radio frequency signals to initiate operation of the motor and functions related to the system 10.

A position potentiometer 62 is coupled to the door directly or indirectly so as generate a position signal 64. The position potentiometer 62 may be coupled to the motor 52, the motor driving shaft, the counterbalance mechanism 30 or the torque tube contained within the counterbalance device 30 to correlate the position of the corresponding rotating member to the location of the door 12. Alternatively, the position potentiometer 62 may be coupled to the door itself As those skilled in the art will appreciate, the position potentiometer 62 provides a slidable member coupled to the moving item (the door, the motor shaft, the counterbalance torque drive tube or the like), which generates a specific voltage value for each position. This slidable member controls the voltage output by a voltage divider. Although it is preferred to use a potentiometer to determine door position locations, other devices such as a timer, or counter may be used. Use of either a timer or counter necessitate that a set-up routine be used if the driving motor is ever repositioned by manual movement of the door.

A force detection mechanism 68 is coupled to the motor 52 and generates a force signal 70 that is received by the controller 54. As will be discussed in detail, the force signal 70 represents a force value that is utilized by the controller to determine an overall force value exerted by the motor upon the door or movable barrier. The detection mechanism 68 may include, but is not limited to, a chopper wheel which detects shaft speed, a current draw of the motor during operation, or any other type of monitoring device which detects the indirect force applied by the motor to the trolley arm.

An angle potentiometer 72 is coupled to the interconnection between the trolley arm 34 and the trolley bracket 40. The angle potentiometer 72 detects the angle of the trolley arm with respect to the rail and generates an angle signal 74 which is sent to the controller 54. The signal 74 may be sent by an infrared or radio frequency or may be sent along a wire connected between the potentiometer 72 and the controller 54. A receiver 76 is in electrical communication with the controller 54 for the purpose of receiving a wireless angle signal 74. The angle potentiometer sends a voltage expression of the angular position of the trolley arm to the controller so that the controller can determine an overall force value applied by the motor to the door.

In operation, once the motor 52 is energized, a force is exerted by the motor on the trolley arm which moves the door either in an up direction or a down direction in a manner well known in the art. The force generated by the motor at any moment during travel is correlated to a position detected by the position potentiometer 62 which is input to the controller to generate a force profile for each opening and closing cycle. Accordingly, if a force reading at a particular door position exceeds the force profile threshold for that position, corrective action may be taken by the controller to slow down the motor, stop the motor, or stop the motor and reverse direction of the door. After completion of an opening or closing cycle without any force readings beyond the force profile threshold, the force profile may be updated so as to accommodate minor changes in the force readings.

Figure 3A:
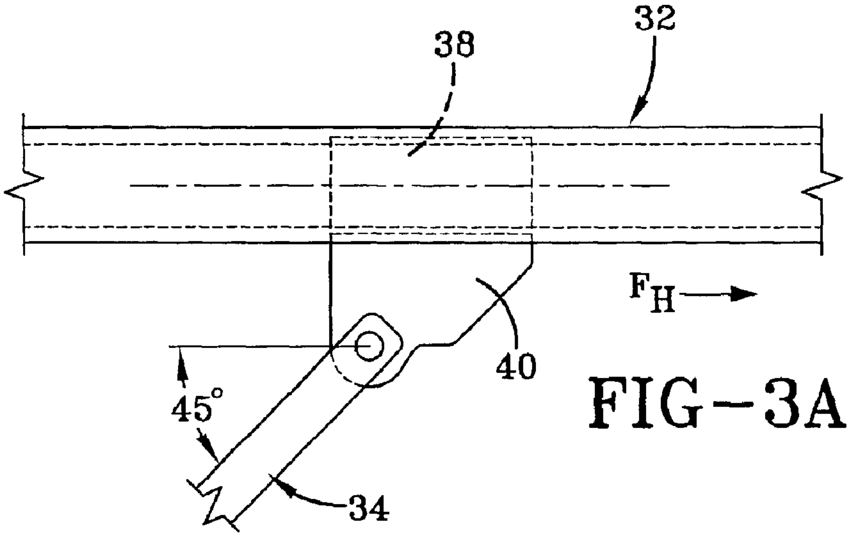
FIGS. 3A–C are enlarged views of different trolley arm positions.

In a first embodiment, in order to generate a force profile, the angle arm 34 is fixed—as seen in FIG. 3A—at a predetermined angle with respect to the trolley. In the preferred embodiment, this angle is at about 45°. Accordingly, the angle force applied by the trolley arm is constant and this value is scaled to the motor force value so as to determine an overall force value. The fixing of the angle between the trolley arm and the trolley removes the non-linear vector forces that result from the arm rotating as the door moves from the closed to open position and from the open to closed positions. With this arrangement, the operator 50 detects and monitors the linear movement of the door 12.

Figure 3B:
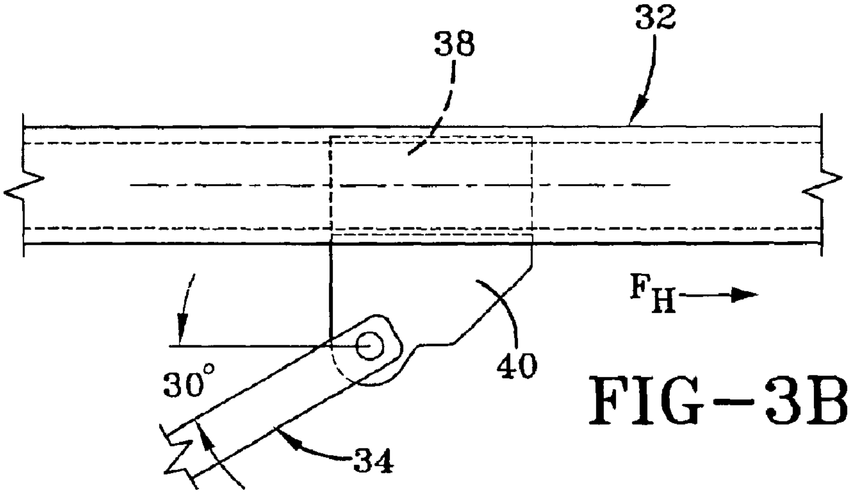
Figure 3C:
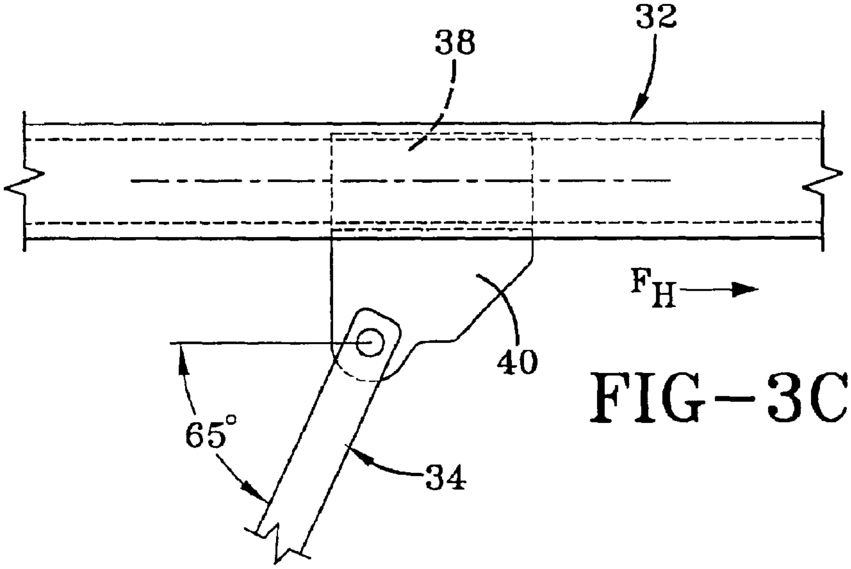

In an alternative embodiment, the trolley arm is allowed to rotate or pivot with respect to the bracket 40 wherein this angular position is detected by the angle potentiometer 72, as seen in FIGS. 3B and 3C. The angle potentiometer 72 measures the angle of the arm 34 with respect to the bracket 40 or rail and sends a representative voltage signal to the controller 54. The voltage signal is received by the controller and the angle value detected is scaled into the force values determined by the force detection mechanism 68 to determine the total force being applied to the door at any position along the door's travel. The controller 54 then calculates the force that the motor is imparting on the door, which in turn is equated to the force the door is imparting on an entrapped object. Accordingly, the controller has the ability, once the angle and force values are known to detect an overall force value. It will be appreciated that the trolley arm may be allowed to have an angular movement of anywhere between 20° and 70° and which may be limited as deemed appropriate.

Figure 4:
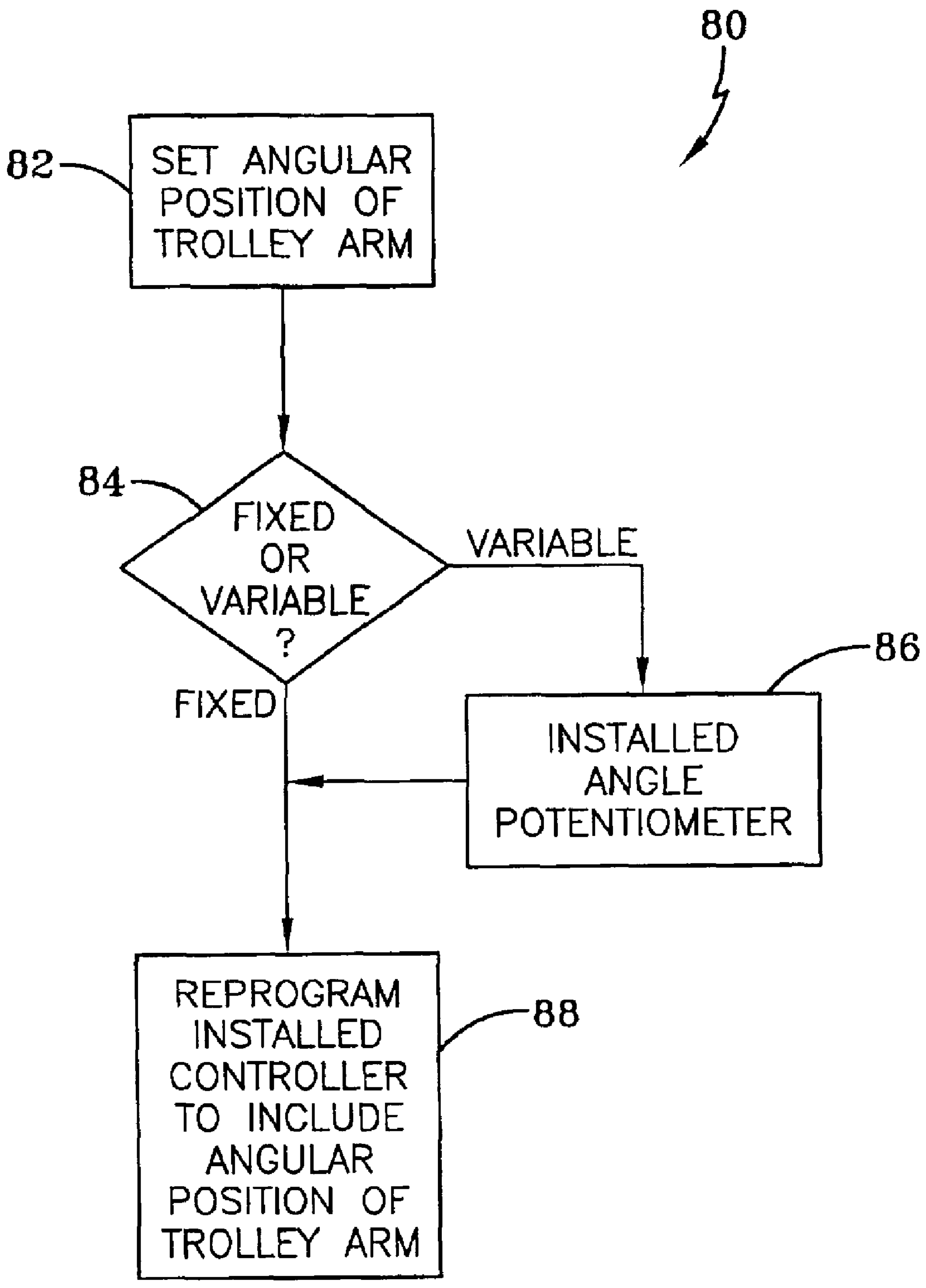
FIG. 4 is a flow chart showing the steps for modifying an existing operator system to incorporate the concepts of the present invention.

Referring now to FIG. 4 a flow chart showing the steps for modifying an existing or pre-installed operator system is designated generally by the numeral 80. It will be appreciated that the features of the system 10 are preferably installed with new movable barrier operator systems. However, there are a significant number of already installed operator systems that would benefit from the advantages of the system 10. Accordingly, authorized service personnel may retro-fit or modify existing operator systems to implement the features of the present invention. Accordingly, at step 82 the technician will set an angular position of the trolley arm with respect to the rail. Depending upon the desires of the operator and the end user, the trolley arm may be either fixed or placed in a variable position. If the trolley arm is placed in a fixed position, the rail 32 may need to be lengthened and the operator moved accordingly. In any event, if a variable angle trolley arm is to be utilized then the technician will install an angle potentiometer at step 86, wherein the angle potentiometer is placed between the trolley bracket 40 and the trolley arm 34. After installation is complete or if the trolley arm 34 is fixed with respect to the rail, the technician, at step 88, re-programs the controller 54 to allow for detection of the angular position of the trolley arm and calculation of the force applied by the motor to the movable barrier in the manner described above.

In light of the foregoing, the advantages of the present invention are readily apparent. Primarily, the embodiments discussed herein do not require the use of strain gauge or other indirect force measuring devices. It will be appreciated that use of an angle potentiometer is much less expensive than a strain gauge and if the angle of the trolley arm is fixed, the need for an angle potentiometer is eliminated. This construction is advantageous in that it allows the door 12 to function as a door sensor and satisfy the secondary entrapment protection requirement for a closed-loop motorized operator system without the need for other external entrapment protection devices. Accordingly, other costs savings are realized by not requiring photo-cells or edge sensors. And, the wiring required for these other secondary entrapment devices is also eliminated. The present invention is also advantageous in that it allows for retro-fitting of existing operator systems to incorporate the features of the present invention for the purpose of detecting the angle of the trolley arm and to allow the door to function as a door sensor.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. An operator system for sensing forces on a movable barrier, comprising:

a motor;

a rail;

a trolley slidably carried by said rail, said trolley having a trolley bracket;

a trolley arm having a first end connected to said trolley bracket, wherein an angular position of said first end with respect to said trolley bracket is fixed, and said trolley arm having a second end coupled to the movable barrier, wherein said motor moves said trolley which moves the movable barrier;

a force detection mechanism coupled to said motor to determine a first component force value applied by said motor to said trolley arm; and a controller for receiving said first component force value, wherein said controller determines a detected force value by scaling said first component force value with a second component force value derived from the fixed angular position of said trolley arm's first end with respect to said trolley bracket.

2. The system according to claim 1, wherein said fixed angular position is between about 30° to about 60°.

3. The system according to claim 2 further comprising:

a position potentiometer coupled to the movable barrier, said position potentiometer generating a position signal received by said controller, wherein said controller generates a force profile based upon said position signal and said detected force value.

4. The system according to claim 3, wherein said controller controls operation of said motor and at least stops said motor if said detected force value exceeds said force profile.

5. An operator system for sensing forces on a movable barrier, comprising:

a motor;

a trolley;

a trolley arm having a first end slidably supported by said trolley, wherein an angular position of said first end with respect to said trolley is variable and said trolley arm having a second end coupled to the movable barrier, and wherein said motor moves said trolley arm which moves the movable barrier;

a force detection mechanism coupled to said motor to determine a first component force value applied by said motor to said trolley arm; and a controller for receiving said first component force value, wherein said controller determines a detected force value by scaling said first component force value with a second component force value derived from the variable angular position of said trolley arm's first end with respect to said trolley.

6. The system according to claim 5, further comprising:

an angle potentiometer coupled to said first end, said angle potentiometer generating an angle signal received by said controller to generate said second component force value.

7. The system according to claim 6, further comprising:

a position potentiometer coupled to the movable barrier, said position potentiometer generating a position signal received by said controller, wherein said controller generates a force profile based upon said position signal and said detected force value.

8. The system according to claim 7, wherein said controller controls operation of said motor and at least stops said motor if said detected force value exceeds said force profile.

9. A method for sensing forces applied to a movable barrier, wherein a motor slidably moves a trolley carried by a rail, wherein the trolley has a trolley bracket from which extends a trolley arm that has an opposite end coupled to the movable barrier, the motor moving the barrier between open and closed positions, the method comprising:

detecting a first component force value generated by the motor;

detecting a second component force value derived from an angular position of the trolley arm's angular position with respect to the trolley bracket; and determining a detected force value by scaling said first component force value with said second component force value.

10. The method according to claim 9, further comprising:

fixing trolley arm's angular position with respect to the trolley bracket so that said second component force value is constant.

11. The method according to claim 10, further comprising:

fixing the trolley arm's angular position with respect to the trolley bracket between about 30° and 60°.

12. The method according to claim 11, further comprising:

coupling a position potentiometer to the movable barrier;

receiving a position signal generated by said position potentiometer; and generating a force profile based upon said position signal and said detected force value.

13. The method according to claim 12, further comprising:

stopping said motor if said detected force value exceeds said force profile.

14. The method according to claim 9, further comprising:

allowing said trolley arm's angular position with respect to the trolley bracket to vary such that said second component force value is variable.

15. The method according to claim 14, further comprising:

coupling an angle potentiometer to said trolley arm;

receiving an angle signal generated by said angle potentiometer; and generating said second component force value from said angle signal.

16. The method according to claim 15, further comprising:

coupling a position potentiometer to the movable barrier;

receiving a position signal generated by said position potentiometer; and generating a force profile based upon said position signal and said detected force value.

17. The method according to claim 16, further comprising:

stopping said motor if said detected force value exceeds said force profile.

18. A method for modifying an installed operator system to enable sensing of forces applied to a movable barrier, wherein a motor moves a trolley slidably carried by a rail, wherein the trolley has a trolley bracket from which extends a trolley arm that is connected at an opposite end to the movable barrier, the motor moving the barrier between open and closed positions, and wherein the motor applies a force detected by a controller, the method comprising:

establishing an angular position of the trolley arm with respect to the trolley bracket; and re-programming the controller to receive a value of said angular position for the purpose of determining a detected force value applied by the motor to the movable barrier.

19. The method according to claim 18, further comprising:

fixing said angular position of the trolley arm with respect to the trolley bracket so that said value of said angular position is constant.

20. The method according to claim 18, further comprising:

coupling an angle potentiometer to the trolley arm, wherein said angle potentiometer generates said value of said angular position.

21. The method according to claim 18, wherein said re-programming step comprises:

modifying generation of a force profile from said detected force value by scaling a first component force value generated by the motor with said value of said angular position.

* * * * *